Jan. 5, 1965

M. S. MINTZ 3,164,540

ELECTRODIALYZER

Filed Feb. 17, 1961

*INVENTOR.*
MILTON SHELDON MINTZ

BY William T. Drucker

Jan. 5, 1965   M. S. MINTZ   3,164,540
ELECTRODIALYZER
Filed Feb. 17, 1961   2 Sheets-Sheet 2
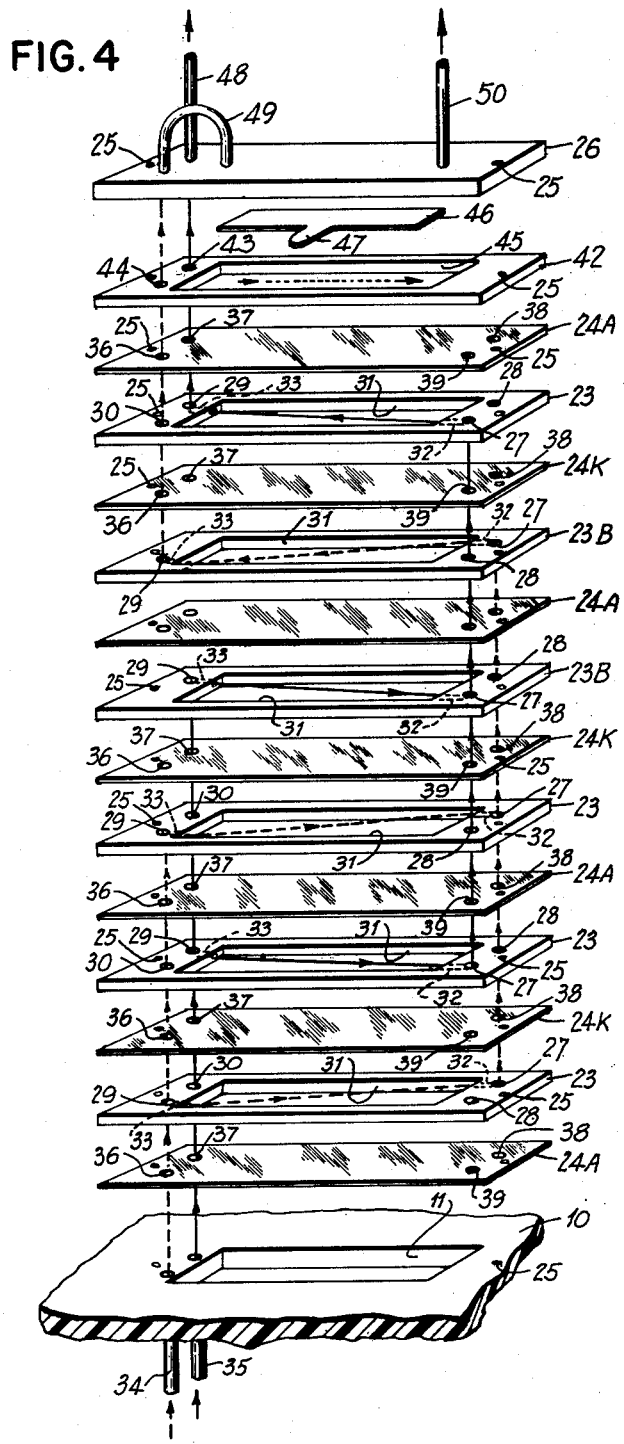
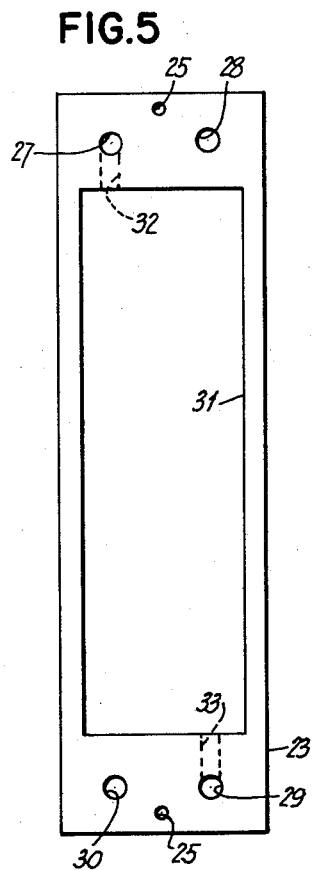
INVENTOR.
MILTON SHELDON MINTZ
BY
William T. Drucker

United States Patent Office 3,164,540
Patented Jan. 5, 1965

3,164,540
ELECTRODIALYZER
Milton Sheldon Mintz, Stamford, Conn., assignor to American Machine and Foundry Company, Inc., a corporation of New Jersey
Filed Feb. 17, 1961, Ser. No. 90,025
12 Claims. (Cl. 204—301)

This is a continuation-in-part of Ser. No. 734,991, filed May 13, 1958, now abandoned.

This invention relates in general to fluid treatment devices, and, more particularly, to electrodialysis apparatus.

When fluids are treated in electrodialysis apparatus, materials in solution tend to become precipitated while passing through the concentrating stream or streams of the particular electrodialysis apparatus used. Precipitates may also be formed at the electrodes. As solid matter is precipitated within electrodialysis apparatus, functioning is seriously impaired.

Elaborate acid feeding devices have been devised to introduce acid into the concentrating streams of electrodialysis apparatus to prevent the formation of precipitates or to dissolve precipitates already formed. Commercial electrodialysis apparatus, such as that which may be used in the home to purify water, must function for long periods of time unattended.

It is, therefore, an object of this invention to provide a long lasting means of great capacity to prevent the formation of harmful precipitates within electrodialysis apparatus.

Another object of this invention is to provide simpler, more efficient and economical means to prevent harmful precipitation within electrodialysis apparatus.

Still another object of this invention is to prevent gas evolution at an electrode from affecting the hydraulic operation of an electrodialysis stack.

A further object of this invention is to provide an electrodialysis apparatus in which acid enters the concentrate stream, to prevent the formation of harmful precipitates, for a very long period of time without requiring additional devices to introduce acid from an exterior reservoir into the electrodialysis apparatus.

An additional object of this invention is to provide an electrodialysis apparatus in which a considerably smaller and less expensive electrode may be used.

Many other objects, advantages and features of invention reside in the particular construction, arrangement and combination of parts involved in the disclosed embodiment of the invention and the practice of the invention in general as will be understood from the following description and accompanying drawing wherein:

FIG. 4 is an exploded perspective view of the elements forming an electrodialysis stack and a fragment of an enlarged electrode chamber according to this invention; and FIG. 5 is a plan view of a gasket which may be used to assemble an electrodialysis stack according to this invention.

Figure 1:
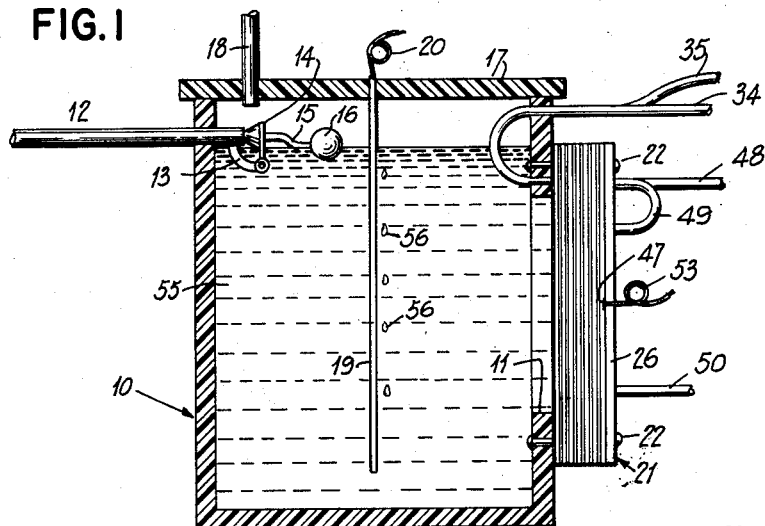
FIG. 1 is a vertical section through an open electrode compartment with an electrodialysis stack mounted on it.
Figure 2:
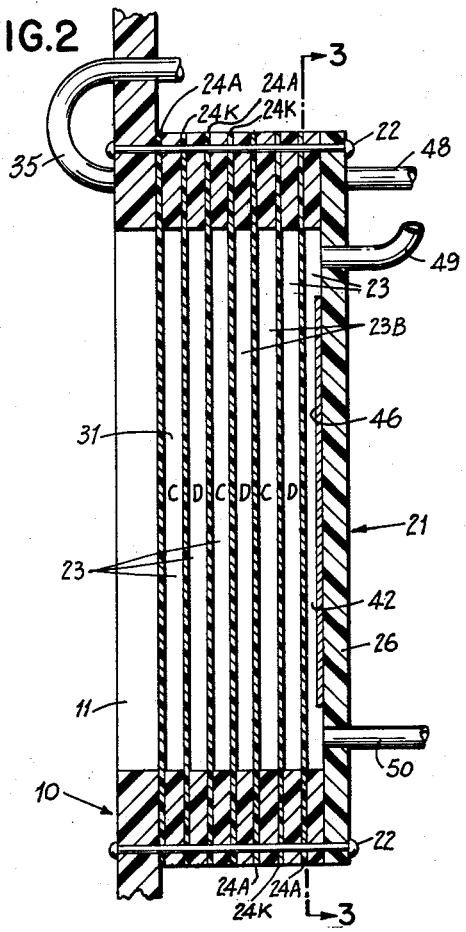
FIG. 2 is a vertical section through the electrodialysis stack mounted on a fragment of the electrode compartment.

Referring to the drawing in detail, FIG. 1 shows a large tank 10 containing a small rectangular opening 11 in one wall. A water pipe 12 enters the tank 10 and is connected to a suitable water supply, such as the regular domestic water supply of a residence. A small bracket 13 extends from the end of the pipe 12 and has pivotally attached to it a closure member 14. Extending from the closure member 14 is an arm 15 carrying a float 16. Thus the float 16 maintains a fluid level within the tank 10 because, if the fluid level within the tank 10 drops to lower the float 16, the arm 15 will pivot the closure member 14 to allow water to flow into the tank 10 through the pipe 12. This arrangement maintains the level of the fluid above the tank opening 11 whereby said opening is always submerged.

The top of the tank 10 is closed by means of a cover 17 which is pierced by an air vent 18 which vents the interior of the tank 10 to the atmosphere. Also extending through the cover 17 is an electrode 19 which has a lead 20 attached to its upper end.

Referring now to FIGS. 2, 3, 4 and 5, an electrodialysis stack 21 is secured over the rectangular opening 11 in the tank 10 by means of bolts or rivets 22. The electrodialysis stack 21 is built up from alternately inverted gaskets 23 interspersed with the alternately anion and cation permeable membranes 24A and 24K.

Each gasket 23 contains two alignment apertures 25 through which the bolts or rivets 22 may pass to secure the elements of the stack between an end plate 26 and the wall of the tank 10. Each gasket 23 also contains the four fluid flow apertures 27, 28, 29 and 30. In each gasket there is formed a large central cutout portion 31. Extending from oppositely disposed apertures 27 and 29 and communicating with the large central opening 31 are the internally formed fluid flow apertures 32 and 33.

Referring now to FIGS. 1 and 4, it may been seen that a concentrate stream inlet tube 34 and a dilute stream inlet tube 35 extend through into the container 10 through its wall and then extend back through the wall of the container 10 to communicate with fluid flow apertures formed within the electrodialysis stack. Each membrane 24A and 24K has four fluid flow apertures 36, 37, 38 and 39 formed in it to correspond to the apertures 27, 28, 29 and 30 of adjacent gaskets 23. As may be further seen in FIG. 4, since alternate gaskets 23 are inverted, fluid from the concentrate stream inlet tube 34 flows from apertures 29 in alternate gaskets 23 through the internal passages 33, through the large central openings 31 and then through the internal passages 32 into the apertures 27 in these alternate gaskets.

If an entire electrodialysis stack were assembled in this manner, parallel flow would result, because fluid from the concentrate stream 34 would flow across alternate gaskets 23 while fluid from the dilute stream inlet tube 35 would flow across the interspersed and inverted gaskets 23. However, as is further shown in FIG. 4, two gaskets 23B are assembled in the electrodialysis stack. Each gasket 23B is identical to a gasket 23 except that the gaskets 23B do not contain an aperture 30. Since the aperture 30 is blocked in the gaskets 23B, fluid from the concentrate stream inlet tube 34, as shown by a dotted line, flows first in parallel through two gaskets 23 and then flows in series through the uppermost gasket 23B. Meanwhile, fluid from the dilute stream inlet tube 35, as indicated by a solid line, flows through two gaskets 23 in parallel and then through the uppermost gasket 23 in series.

As is further shown in FIG. 4, assembled above the uppermost membrane 24A is an electrode compartment forming gasket 42 which contains two fluid flow apertures 43 and 44 and a large central opening 45. The apertures 43 and 44 align with the apertures 37 and 36 in the adjacent membrane 24A. A thin platinum foil electrode 46 extends within the opening 45 and has a projection 47 which extends beyond the electrode compartment forming gasket 42. The cover plate 26 has fixed to it a product stream outlet tube 48 which communicates with aperture 43 in gasket 42. The concentrate stream outlet tube 49 communicates with the aperture 44 in the gasket 42 and leads the concentrate stream back through the end plate 26 and communicates with one end of the opening 45 in the electrode compartment forming gasket 42. This stream then becomes a concentrate and electrode washing stream and it flows from the electrode compartment through the outlet tube 50.

As shown in FIG. 1, the projection 47 of electrode 46 extends beyond the sides of the electrodialysis stack 21 and the lead 53 is connected to it.

This invention may be used in the following manner. The tank 10 is filled with a suitable acid or acid salt solution 55 such as a one normal solution of HCl, $H_2SO_4$, or $NaHSO_4$. The leads 20 and 53 are then connected to a suitable source of direct current so that one electrode 19 functions as a cathode and the other electrode 46 functions as an anode. Since some membranes 24A are anion permeable and other membranes 24K are cation permeable, the central openings 31 in alternate gaskets 23 will become diluting cells as indicated by the letter D in FIG. 2. Alternate cells will become concentrating cells as indicated by the letter C.

Any precipitates which may be then formed about the electrode 19 which is functioning as a cathode would immediately be dissipated by the surrounding acid solution 55 within the tank 10. Furthermore, any hydrogen gas bubbles 56 or other products generated about the electrode 19 are far removed from the nearest membrane 24A so that they cannot destructively attack it. Any gasses which are generated in the tank 10 escape through the vent 18. As the electrodialysis stack 21 operates, electrodialytic transfer or diffusion carries a certain amount of the acid in solution 55 through the adjacent membrane 24A and into the concentrate stream to pass through the stack 21 and attack precipitates which may be formed within it. Since the concentrate stream, as it emerges from stack 21, is introduced by a tube 49 into the electrode compartment wherein electrode 46 is functioning as an anode, some of the acid which is carried through the concentrate stream of the electrodialysis stack 21 may then be used to attack precipitates which may be formed about the anode electrode 46. As acid passes from the tank 10, the fluid level is maintained by means of a float 16 and pipe 12.

*Example*

In one example, a 200 gallon per day electrodialysis stack was assembled. This electrodialysis stack had large central openings 31 within its gaskets 23 which measured one inch wide and twelve inches long. The gaskets were .040" thick. The stack was assembled with 40 gaskets 23 and 23B in 20 cell pairs so that both the dilute and concentrating streams flowed in parallel with each other and each stream flowed through eight groups of cells in series. The first group had four cells, the second group had four cells, the third and fourth groups each had three cells, the fifth and sixth groups each had two cells, and the seventh and eighth groups each had one cell. This particular construction increases the flow velocity of the dilute stream as it proceeds through the stack to reduce the possibility of polarization at the membrane faces.

From separate tests which were run, it was found that a 42 gallon tank of a one normal acid solution would last more than a year for the processing of 200 gallons per day of 1150 p.p.m. total dissolved solids or 500 p.p.m. total hardness water. Thus it can be seen that, in a commercial or domestic unit where space requirements are not critical, this invention allows the uninterrupted operation for long periods of time of electrodialysis stacks without any danger of precipitation impairing their functioning.

Figure 3:
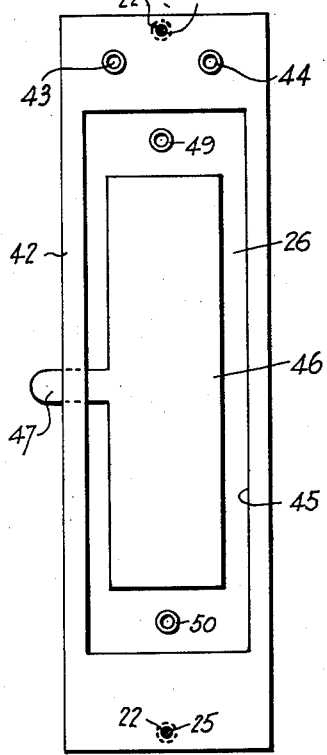
FIG. 3 is a section taken on line 3—3 of FIG. 2.

Furthermore, some of the cost of the large container 10 is offset in that another advantage arises in the practice of this invention. Since the cathode electrode 19 is immersed in a highly conductive acid solution and since it is disposed a good distance from the nearest membrane 24A, a much smaller electrode 19 may be used than a conventional electrode such as electrode 46 as shown in FIG. 3. When an electrode is used in a conventional stack fairly close to a membrane, the area of the electrode must be a certain percentage, usually at least 20%, of the effective area of the adjacent membrane. Since electrode 19 is far removed from the nearest membrane 24A, it may present a relatively small area and be formed from a thin filament of platinum wire rather than more expensive platinum foil.

In addition, in some particular applications, it may be desirable to use the tank 10 as an anode compartment rather than a cathode compartment. Chlorine or oxygen generated at an anode will attack an adjacent membrane. However, should tank 10 be filled with a $NaHSO_3$ solution, it would reduce the chlorine or oxygen formed at the electrode 19 so that it could not attack an adjacent membrane. In addition, the electrode 19 is sufficiently removed from the nearest membrane so that products generated at the electrode 19 are less likely to attack a membrane and they will merely rise to escape through the vent 18.

While one embodiment of this invention has been shown and described, many modifications are possible. For example, a single tank 10 could have several electrodialysis stacks 22 mounted on it and sharing a common electrode 19. The size of container 10 is only limited by the acid requirements of the stack or stacks 21 mounted on it and the period of time over which it is desired to operate the stacks 21 without troublesome precipitation. To be effective for an appreciable period of time, the volume of tank 10 must exceed at least twice the total fluid volume of a stack 21. While one particular type of electrodialysis stack construction has been shown and described, this invention is not limited to this particular stack construction, but it may be used with many other types of electrodialysis stacks.

What is claimed is:

1. A fluid treatment device comprising, in combination, an electrodialysis stack having membranes defining fluid treatment compartments, at least some of said membranes being ion selective, an electrode disposed beyond said membranes, a tank having a volume at least twice that of the total volume of all the fluid treatment compartments of said stack, said tank having an aperture over which said electrodialysis stack is secured, a second electrode disposed within said tank and means to maintain a predetermined level of an electrolyte in said tank whereby the tank aperture is submerged.

2. A fluid treatment device comprising, in combination, an electrodialysis stack having membranes defining fluid treatment compartments, at least some of said membranes being ion selective, an electrode disposed beyond said membranes, a tank having a volume at least twice that of the total volume of all said fluid treatment compartments, said tank containing an aperture over which said electrodialysis stack is disposed, an electrolyte within said tank, a second electrode within said tank and means to maintain a level of electrolyte in said tank sufficient to submerge the aperture in said tank.

3. A fluid treatment device comprising, in combination, at least one electrodialysis stack having membranes defining fluid treatment compartments, at least some of said membranes being ion selective, at least one electrode disposed at one end of said stack, a tank containing an aperture over which said electrodialysis stack is secured with said electrode disposed away from said tank, said tank having a volume at least greater than twice the total volume of all said fluid treatment compartments, an acid solution within said tank, an electrode within said tank and means to maintain the level of the acid solution above said aperture in said tank.

4. A fluid treatment device comprising, in combination, an electrodialysis stack having membranes defining fluid treatment compartments, at least some of said membranes being ion selective, an anode disposed within said stack, a tank containing an aperture over which said electrodialysis stack is secured, said tank having a volume at least twice that of the total volume of all said fluid treatment compartments, an anion permeable membrane adjacent to the aperture in said tank, an acid solution within said tank, a cathode within said tank and means to maintain the level of the acid solution above the aperture in the tank.

5. The combination according to claim 4 wherein said tank is vented to the atmosphere.

6. The combination according to claim 4 in which said electrodialysis stack contains a concentrating and a diluting stream, said electrodialysis stack has an anode compartment containing said anode, and the concentrating stream of said electrodialysis stack is directed through said anode compartment containing said anode.

7. A fluid treatment device, comprising, in combination, an electrodialysis stack having membranes defining fluid treatment compartments, at least some of said membranes being ion selective, at least one electrode disposed within said stack, a tank containing an opening over which said electrodialysis stack is secured, one of said membranes covering at least part of said opening, said tank having a volume equal to at least twice that of the total volume of all said fluid treatment compartments, an electrode disposed within said tank remote from said opening having an area facing said opening which is less than 20% of the area of said opening and means to maintain an electrolyte level in said tank above the opening in said tank.

8. A fluid treatment device comprising, in combination, membranes, gaskets containing openings and being interspersed between said membranes with the openings in said gaskets forming fluid treatment compartments, at least some of said membranes being ion selective, an electrode compartment forming gasket containing an aperture forming an electrode compartment, an anode within said electrode compartment, a tank containing an opening over which said electrodialysis stack is secured, said tank having a volume at least twice that of the total volume of all said fluid treatment compartments, the membrane adjacent to the opening in said tank being anion permeable, an acid solution within said tank, a cathode within said tank and means to maintain an electrolyte in said tank at a level above the aperture in said tank.

9. The combination according to claim 8 wherein said tank is vented to the atmosphere.

10. The combination according to claim 9 in which some of said fluid treatment compartments define a part of a concentrating stream flow path which is then at least partly directed through said anode compartment.

11. The combination according to claim 9 wherein the area of said cathode facing the opening in said tank is less than 20% of the area of the opening in said tank.

12. A fluid treatment device comprising, in combination, an electrodialysis stack having membranes defining fluid treatment compartments, at least some of said membranes being ion selective, at least one electrode disposed within said stack, a tank having a volume at least twice that of the total volume of all the fluid treatment compartments of said stack, said tank having an aperture over which said stack is secured, an electrode remote from said membranes within said tank and means to maintain an electrolyte in said tank at a level above the aperture in said tank.

References Cited in the file of this patent
UNITED STATES PATENTS

| | | |
|---|---|---|
| 2,689,826 | Kollsman | Sept. 21, 1954 |
| 2,752,306 | Juda et al. | June 26, 1956 |
| 2,799,644 | Kollsman | July 16, 1957 |
| 2,829,095 | Oda et al. | Apr. 1, 1958 |
| 2,835,632 | Kollsman | May 20, 1958 |